United States Patent [19]

Shaw et al.

[11] Patent Number: 4,768,851
[45] Date of Patent: Sep. 6, 1988

[54] FIBER OPTIC MODAL COUPLER, INTERFEROMETER AND METHOD OF COUPLING SPATIAL MODES USING SAME

[75] Inventors: Herbert J. Shaw, Stanford; Robert C. Youngquist; Janet L. Brooks, both of Mountain View, all of Calif.

[73] Assignee: The Board of Trustees of the Leland Stanford Junior University, Stanford, Calif.

[21] Appl. No.: 884,871

[22] Filed: Jul. 9, 1986

Related U.S. Application Data

[63] Continuation of Ser. No. 556,306, Nov. 30, 1983, abandoned.

[51] Int. Cl.[4] .......................... G02B 6/26; G01B 9/02
[52] U.S. Cl. .............................. 350/96.15; 350/96.29; 350/96.30; 350/320; 350/371; 356/345; 356/351
[58] Field of Search ............... 350/96.10, 96.14, 96.15, 350/96.16, 96.29, 96.30, 370, 371, 374, 384, 389, 400, 320; 356/345, 351, 364, 365; 250/227

[56] References Cited

U.S. PATENT DOCUMENTS

| | | | |
|---|---|---|---|
| 3,645,603 | 2/1972 | Smith | 350/371 |
| 3,666,348 | 5/1972 | Marcatili | 350/96.10 X |
| 3,931,518 | 1/1976 | Miller | 350/96.15 |
| 4,019,051 | 4/1977 | Miller | 350/96.15 |
| 4,153,328 | 5/1979 | Wang | 350/96.15 |
| 4,236,786 | 12/1980 | Keck | 350/96.15 |
| 4,253,727 | 3/1981 | Jeunhomme et al. | 350/96.15 |
| 4,342,907 | 8/1982 | Macedo et al. | 250/227 |
| 4,386,822 | 6/1983 | Bergh | 350/96.15 |
| 4,389,090 | 6/1983 | Le Fevre | 350/96.29 |
| 4,684,215 | 8/1987 | Shaw et al. | 350/96.29 |
| 4,699,513 | 10/1987 | Brooks et al. | 250/227 X |

FOREIGN PATENT DOCUMENTS

| | | | |
|---|---|---|---|
| 6234480 | 9/1980 | Australia | 250/227 |
| 3006102 | 8/1980 | Fed. Rep. of Germany | 350/96.15 |
| 3013335 | 10/1981 | Fed. Rep. of Germany | 350/96.15 |
| 3035153 | 4/1982 | Fed. Rep. of Germany | 350/96.15 |
| 52-54450 | 5/1977 | Japan | 350/96.15 |

OTHER PUBLICATIONS

Wijngaard, "Guided Normal Modes . . . Dielectric Rods" J. of Opt. Soc. of Amer., vol. 63, No. 8, 8/73, pp. 944–950.
Bykov et al., "Polarization Modulation . . . Waveguide" Sov. Tech. Phys. Lett., vol. 6, No. 1, 1/81, pp. 24–25.
Ohashi et al., "Phase-Matched Light Amplification . . . " Appl. Phys. Lett., 12/82, pp. 1111–1112.
Nosu et al., "Acousto-Optic Frequency Shifter . . . " Naval Research Lab, 29C5-3, 2 pages.
Yariv, "Coupled-Mode Theory for Guided-Wave Optics", *IEEE Journal of Quantum Electronics*, vol. QE-9, No., Sep. 1973, pp. 919–933.
Chinone et al., "Elasto-Optic Polarization Measurement in Optical Fiber", *Optics Letters*, vol. 6, No. 1, Jan. 1981, pp. 16–18.
Miller, "On Solutions for Two Waves with Periodic Coupling", *The Bell System Technical Journal*, Oct. 1968, pp. 1801–1822.
Katsuyama, "Single-Mode Propagation in 2-Mode Region of Optical Fibre by Using Mode Filter", *Electronic Letters*, vol. 15, 1979, pp. 442–444.

(List continued on next page.)

Primary Examiner—William L. Sikes
Assistant Examiner—Brian M. Healy
Attorney, Agent, or Firm—Knobbe, Martens, Olson & Bear

[57] ABSTRACT

A modal coupler, for coupling between first and second order modes of an optical fiber, comprises a single continuous strand of optical fiber, and a device for applying stress to the optical fiber at spaced intervals along the fiber. The stress deforms the fiber and abruptly changes the fiber geometry at the beginning and end of each stressed region. The change in fiber geometry causes coupling of light from the fundamental mode to the second order mode. The coupler, under certain conditions, exhibits polarization dependence, and thus, it may be utilized as a fiber optic polarizer. In addition, the device couples coherently, and may be used in interferometric systems.

20 Claims, 6 Drawing Sheets

OTHER PUBLICATIONS

Modulator and Tap", IBM Tech. Disclosure Bulletin, vol. 21, No. 2, Jul. 1978.

Gloge, "Weakly Guiding Fibers" Applied Optics, vol. 10, No. 10, Oct. 1971, pp. 2252-2258.

K. Nosu et al., "Acousto-Optic Frequency Shifter for Single-Mode Fibers", *Electronics Letters*, vol. 19, No. 20, Sep. 29, 1983.

F. Heismann et al., "Integrated Optical Single-Sideband Modulator and Phase Shifter", *IEEE Journal of Quantum Electronics*, vol. QE 18, No. 4, Apr. 1982, pp. 767-771.

R. Ulrich et al., "Single-Mode Fiber-Optical Polarization Rotator", *Applied Optics*, vol. 18, No. 11, Jun. 1, 1979, pp. 1857-1861.

Harris et al., "Acousto-Optic Tunable Filter", J. of the Optical Society of America, vol. 59, No. 6, Jun. 1969, pp. 744-747.

Alferness et al., "Waveguide Electro-Optic Polarization Transformer", *Applied Phys. Letters*, vol. 38, No. 9, May 1, 1981, pp. 655-657.

Rashleigh et al., "Preservation of Polarization in Single-Mode Fibers", *Fiberoptic Technology*, May 1983, pp. 155-161.

Alferness et al., "Tunable Electro-Optic Waveguide . . . Filter", *Applied Physics Letters*, vol. 40, No. 10, May 15, 1982, pp. 861-862.

Goto et al., "Optical Switching Characteristics . . . Acoustic Waves", *Transactions of the IECE of Japan*, vol. E66, No. 7, Jul. 1983, pp. 442-449, Tokyo.

Jeunhomme et al., "Directional Coupler for Multimode Optical Fibers", *Applied Physics Letters*, vol. 29, No. 8, Oct. 15, 1976, pp. 485-487.

Heismann et al., "Intergrated-Optical Single-Sideband . . . " *IEEE Transactions on Microwave Theory and Techniques*, vol. MTT-30, No. 4, Apr. 1982, pp. 613-617.

Gfeller, "Electroacoustic Transducers for Optical Fiber

FIBER OPTIC MODAL COUPLER, INTERFEROMETER AND METHOD OF COUPLING SPATIAL MODES USING SAME

This application is a continuation of application Ser. No. 556,306, filed Nov. 30, 1983, now abandoned.

BACKGROUND OF THE INVENTION

The present invention relates generally to fiber optic directional couplers, and more specifically, to devices which selectively couple light energy between the modes of an optical fiber.

Fiber optic directional couplers provide for the transfer of optical energy traveling in one fiber optic waveguide to another. Such couplers are useful for a variety of applications, e.g. in fiber optic sensors.

As is well known in the art, a single optical fiber may provide two or more waveguides under certain conditions. These waveguides are commonly referred to as the normal modes of a fiber, which may be conceptualized as independent optical paths through the fiber. Normal modes have unique electric field distribution patterns which remain unchanged, except for amplitude as the light propagates through the fiber. Additionally, each normal mode will propagate through the fiber at a unique propagation velocity.

The number of modes which may be supported by a particular optical fiber is determined by the wavelength of the light propagating therethrough. If the wavelength is greater than the "cutoff" wavelength, the fiber will support only a single mode. If the wavelength is less than cutoff, the fiber will begin to support higher order modes. For wavelengths less than, but near cutoff, the fiber will support only the fundamental, or first order mode, and the next, or second order mode. As the wavelength is decreased, the fiber will support additional modes, e.g. third order, fourth order, etc. These first order, second order, third order, etc. normal modes are commonly referred to as the "spatial" modes of the fiber.

Each of spatial the normal modes (e.g. first order, second order, etc.) are orthogonal, that is, there is no coupling between the light in these modes. In addition, each of the spatial normal modes includes two orthogonal polarization modes, which may be defined e.g. as the linear vertical polarization mode and the linear horizontal polarization mode. The orientation of the electric field vectors of the modes defines the polarization of the light in the mode, e.g. linear vertical, or linear horizontal. A more complete discussion of these modes, and their corresponding electric field patterns, will be provided below.

SUMMARY OF THE INVENTION

The present invention comprises an all fiber modal coupler for transferring optical power from a fundamental, or first order mode, to the second order mode of an optical fiber, in a controlled manner.

The coupler is advantageously quite simple in structure, and includes an optical fiber, having a core surrounded by a cladding, and a light source for introducing a lightwave into the optical fiber, for propagation therethrough. The lightwave produced by the light source has a wavelength below the cutoff wavelength, to cause the lightwave to propagate through the fiber in both first and second order modes.

The invention additionally comprises a device for applying stress to the optical fiber at spaced intervals along the fiber to provide a series of stressed regions which cause coupling of light energy between the first and second order modes. In the preferred embodiment, this stress applying device comprises a plate having a series of grooves cut on one face thereof to provide a series of ridges. These ridges are oriented perpendicular to the longitudinal axis of the fiber, and a force is applied thereto. The force is sufficient to asymmetrically deform the fiber at the stressed regions to cause a relatively abrupt change in fiber geometry at the boundary between each of the stressed regions and the adjacent unstressed regions. This abrupt change in fiber geometry causes coupling between the first and second order modes of the fiber.

In the preferred embodiment, the beginning of one stressed region is separated by one beat length from the beginning of the next adjacent stressed region. Further, the length of each of these stressed regions is preferably one-half beat length so that each of the unstressed regions will also be one-half beat length in length. The term "beat length" as used herein, is mathematically defined as the wavelength of the lightwave propagating through the fiber divided by the difference in refractive indices of the first and second order modes. Stated another way, the beat length is the distance required for the first and second order modes to separate in phase by 360°, due to their dissimilar propagation velocities.

Test results show that the coupler of the present invention exhibits surprising anomalous behavior when compared to conventional coupled mode theory. For example, conventional coupled mode theory predicts that the coupler should be wavelength dependent. However, the test results show that the coupling is substantially independent of the wavelength of the light over a broad range.

The coupler also exhibits another type of anomalous behavior, namely, that as the number of stress regions is increased, the coupling becomes polarization dependent. For example, using a thirty ridge device, 40 dB coupling of the vertically polarized fundamental mode to the higher order mode was achieved, whereas with the same set up, the horizontally polarized fundamental mode coupled only 4 dB of power into the higher order mode, yielding a 36 dB extinction ratio between the vertical and horizontal polarizations in the fundamental modes. With a ten ridge device, however, very little discrepancy between the coupling of the two polarizations was observed.

The polarization dependence of the coupler may be advantageously utilized to provide an all fiber optic polarizer. Thus, in another embodiment of the invention, a second order mode stripper is provided at the coupler output to remove the higher order modes into which the light has been coupled. Assuming that the vertical polarization is well coupled and the horizontal polarization is poorly coupled, input light which is horizontally polarized would be passed by the coupler and mode stripper, while vertically polarized light would be effectively blocked.

Additionally, the invention may be used as a Mach-Zehnder interferometer by mounting two modal couplers on a single strand of fiber. In such arrangement, a higher order mode stripper is preferably placed on the fiber after the second modal coupler, i.e. at the output of the interferometer, so that only the residual fundamental mode power is output to a detector. By way of specific example, the couplers may be set to about 50/50 coupling and the wavelength of the input light may be varied slightly in order to tune the relative phase difference of the two modes between the couplers. In one test of this device, a dynamic range of the power in the fundamental mode of 30 dB was measured as the fiber was thermally expanded, thereby demonstrating that the device couples coherently, and is suitable for use in interferometric systems.

BRIEF DESCRIPTION OF THE DRAWINGS

These and other features of the present invention are best understood through reference to the drawings, in which.

DETAILED DESCRIPTION OF THE PREFERRED EMBODIMENT

The coupler of the present invention comprises a single strand of nonbirefringent single mode optical fiber operated at a wavelength above cutoff such that the fiber supports both fundamental and second order guided modes. Coherent coupling between these modes is achieved by stressing the fiber at periodic intervals, e.g. once per beat length. The fundamental and second order guided modes provide two orthogonal paths through the fiber which permits the device to be used as a two channel medium, e.g. as in in-line Mach-Zehnder interferometer, and as a two channel medium in data systems.

Before discussing the structural details and operational theory of the present invention, a brief summary of mode theory will be presented, to provide background for more fully understanding of the invention.

Mode Theory

When a single mode fiber is used at a wavelength below cutoff, it will begin to guide higher order modes. The wavelength at cutoff ($\lambda_c$) is related to the fiber geometry, and may be calculated utilizing the following equation:

$$\lambda_c < \frac{2\pi r \sqrt{n_c^2 - n_{cl}^2}}{2.405} \tag{1}$$

Where r is the core radius, $n_c$ is the refractive index of the core, and $n_{cl}$ is the refractive index of the cladding.

If the indices of the core and cladding are approximately equal, then it can be shown that the $LP_{11}$ modes are the next modes (i.e. the second order modes) beyond the fundamental modes $LP_{01}$ which are guided. These modes are defined and described in detail in an article by D. Gloge, entitled "Weakly Guiding Fibers", *Applied Optics*, 10, 2252 (1971).

Figure 1:
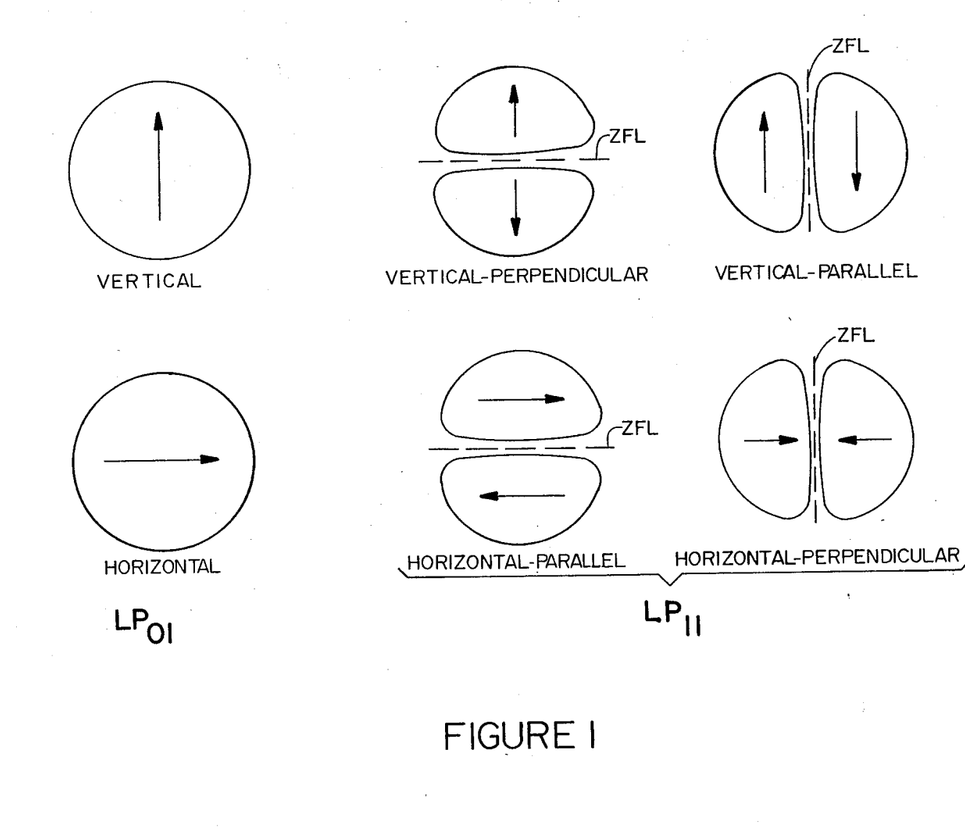
FIG. 1 is a schematic diagram illustrating the electric field patterns of the first and second order modes, $LP_{01}$ and $LP_{11}$, respectively.

FIG. 1 shows the field patterns of the two modes in the fundamental $LP_{01}$ set of modes and the four modes in the second order $LP_{11}$ set of modes. The arrows indicate the direction of the electric field vectors at a particular instant in time.

For the $LP_{01}$ fundamental modes, the electric field vector is either vertical, representing vertically polarized light or horizontal, representing horizontally polarized light. However, for the $LP_{11}$ second order modes, the vertical polarization and the horizontal polarization each have two electric field patterns. Further, each of the second order mode field patterns is comprised of two lobes. In one of these field patterns, the electric field vectors of the lobes are perpendicular to the zero electric field line (ZFL), while in the other electric field pattern, the electric field vectors of the lobes are parallel to the zero electric field line (ZFL). The zero electric field line is simply a line between the two lobes in each of the second order mode patterns which represents zero electric field amplitude. Similarly, the horizontally polarized second order modes have electric field vectors oriented either parallel to the ZFL or perpendicular to the ZFL, as shown in FIG. 1.

Each of the six electric field patterns in FIG. 1, namely, the two $LP_{01}$ patterns and the four $LP_{11}$ patterns, are orthogonal to each other. Thus, the six patterns may be viewed as independent optical paths through the fiber, which ordinarily do not couple with each other.

If the indices of the core and the cladding are approximately equal, the two $LP_{01}$ modes will travel through the fiber at approximately the same propagation velocity, and the four second order $LP_{11}$ modes will travel through the fiber at approximately the same propagation velocity. However, the propagagtion velocity for the fundamental $LP_{01}$ set of modes, will be slower than the propagation velocity for the second order $LP_{11}$ set of modes. Thus, the two set of modes $LP_{01}$, $LP_{11}$, will move in and out of phase with each other as the light propagates through the fiber. The propagation distance required for the two sets of modes to move out of phase by 360° is commonly referred to as the beat length of the fiber, which may be mathematically expressed as:

$$L = \frac{\lambda}{\Delta n} \tag{2}$$

where $\lambda$ is the optical wavelength in a vacuum and $\Delta n$ is the difference in the effective refractive indices of the two sets of modes.

Coherent power transfer between the two sets of modes, $LP_{01}$ and $LP_{11}$, can be achieved by producing periodic coupling which matches the beat length of the modes. Such coupling can be implemented by periodically deforming the fiber with the device shown in FIG. 2.

Structural Features of the Coupler

Figure 2:
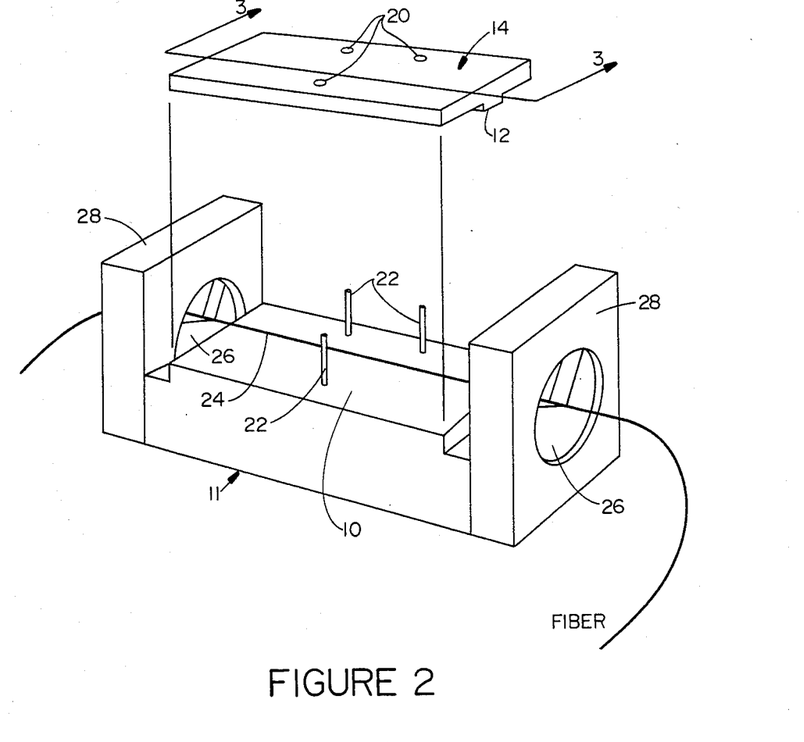
FIG. 2 is an exploded, perspective view of the modal coupler of the present invention.

FIG. 2 shows the coupler of the present invention in perspective view. A polished, flat surface 10 is machined on a metal or plastic block 11. The surface 10 should be smooth and flat to within a few microns. A nonbirefringent optical fiber is disposed between the surface 10 and the undersurface of a second block 14, which has a multiple ridge region 12, machined thereon. The ridge region 12 provides a series of ridge-shaped coupling elements which, when pressed against the fiber so as to squeeze the fiber between the blocks 11, 14, stress the fiber at periodic intervals to cause light to be coupled between the modes.

Referring briefly to FIG. 2, there is shown a cross section of the ridged region 12 in which a plurality of ridges 16 are formed. The ridges 16 are formed by machining the block 14 to provide spaced parallel notches or grooves 17, such that there is formed a plurality of polished ridge surfaces 18, having a width, W, and a separation, S, between the edges of adjacent ridges. In the embodiment shown, the width, W, and separation, S, are each one-half beat length of the fiber for light at the particular frequency which is utilized. In theory, each ridge can be any odd multiple of one-half beat length, and each separation can be any odd multiple of one-half beat length.

The cross section of the notches 17 in the preferred embodiment is rectangular, since that is the easiest shape to machine. However, this shape is not critical; any shape which yields a flat surface 18 on the ridges 16 will be satisfactory, providing that the height, H, of the notch 17 is sufficient to maintain stress when the material of the ridge 16 is deformed by application of force to the fiber. In a preferred embodiment, the block 14 is made of a hard plastic, Deltrin TM. This plastic deforms more readily than glass, and thus, avoids damage to the fiber. For complete power transfer, it is important that the ridges apply stress to the fiber so as to provide alternate regions of deformation and no deformation in the fiber. Further, it has been found that the force of about 3 kg applied to the block 14 is required to achieve maximum coupling, regardless of the number of ridges 12. The overall length of the device is not critical, however, in the embodiment shown, the length is on the order of two to three inches.

Returning to FIG. 1, the block 14 has a plurality of holes 20 which are spaced in a pattern to receive a set of pins 22 projecting from the flat surface 10 in a matching pattern. The block 14 may be slid toward and away from the flat surface 10 along the pins 22. The pins 22 are so aligned and the ridges 16 are oriented such that the edges of the ridges 16 are transverse to the longitudinal axis of a fiber 24 which is held on the flat surface 10 by a pair of fiber holding plates 26. Thus, the edges of the ridges 16, illustrated by the reference numeral 27 in FIG. 2, the transverse to the longitudinal axis of the fiber 24. The pins 22 also serve to prevent rocking of the block 14 to prevent uneven pressure from being applied to the fiber 24. If desired, the ends of the pins 22 may be threaded for receiving respective nuts (not shown), and respective coil springs (not shown) may be placed between the nuts and the upper block 14 in order to control the pressure exerted by the top plate 14 on the fiber 24. The holding plates 26 are disk-shaped with a V-shaped cutout therein for receiving the fiber, and are mounted in respective circular apertures of respective end plates 28, which are mounted at the ends of the block 11 so that they are perpendicular to the flat surface 10. However, any other suitable method of holding the fiber may be used alternatively.

Determining the Fiber Beat Length

To properly size and space the ridges 16, the beat length of the non-birefringent fiber 24 must be known. Unlike birefringent fiber, the beat length of the non-birefringent fiber cannot be directly observed, and a more elaborate procedure is necessary. The particular fiber used as the fiber 24 in the preferred embodiment was a single length of Corning single mode fiber, having an outer diameter of approximately $125\mu$, a cutoff wavelength of approximately 650 nm, a mean index for the core and the cladding of 1.458, a step index profile with a core index of 1.4593, and a cladding index of 1.4567, and a core radius of $2.9\mu$. Vertically polarized light was input to the fiber by offsetting the input beam relative to the central axis of the fiber such that approximately equal amounts of the vertically polarized fundamental $LP_{01}$ mode and the vertical-normal $LP_{11}$ mode (See FIG. 1) were launched. A continuous wave dye laser was used so that the input wavelength could be varied. The fiber output was displayed on a screen and the interference pattern between the two guide modes was observed. As the input wavelength was scanned from 570 nm to 610 nm the output pattern fluctuated periodically (i.e. repeated itself) 40 times. Those skilled in the art will understand that, from this data, the difference between the refractive index between the two sets of modes (i.e. the first and second order modes) may be calculated using the simplified Eigenvalue equations for a cylindrical step index fiber, as discussed in Chapter 8 of *Light Transmission Optics*, Dietrich Marcuse, 2nd edition, Van Nostrand Reinhold Co., 1982 (See especially Section 8.6). For the above-described fiber, a value for the refractive index difference was calculated to be 0.001342, yielding a beat length, calculated in accordance with equation (2), above, of 0.447 mm for a wavelength of 600 nm. The preferred embodiment was constructed as a thirty ridge structure with 0.203 mm wide gaps between ridges, and 0.229 mm wide ridges, yielding a ridge periodicity of 0.432 mm. The gaps and ridges were not equal in length due to fabrication limitations. The wavelength required for a beat-length of 0.432 mm (equal to the ridge periodicity) was calculated to be 608 nm.

Theory of Operation

Figure 4:
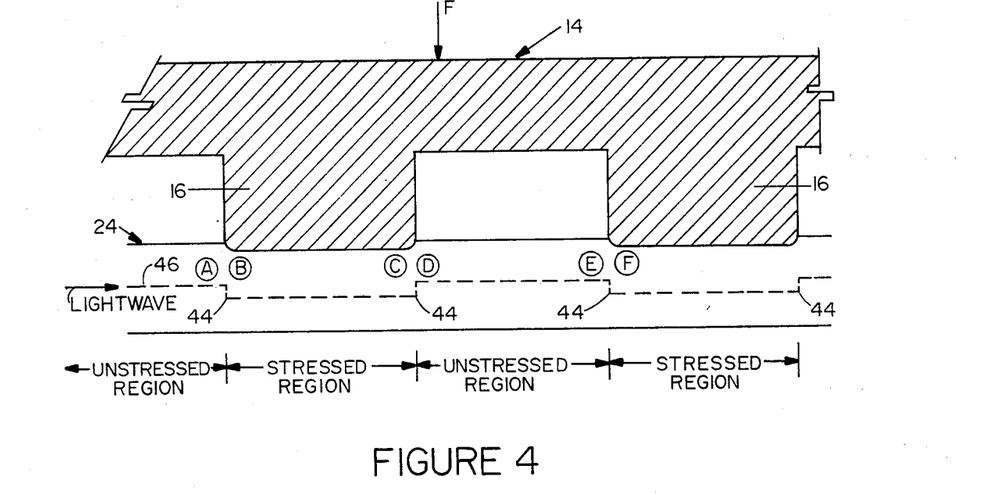
FIG. 4 is a schematic diagram showing a pair of ridges pressed against the optical fiber so as to slightly deform the fiber and cause abrupt changes in fiber geometry at the beginning and end of each ridge.

As shown in FIG. 4, application of a vertical force, F, to the plate 14 presses the ridges 16 against the fiber 24, and thus, causes the portions of the fiber 24 beneath the ridges 16 to be stressed and asymmetrically deformed. The ridges thus cause abrupt changes in fiber geometry at the beginnings and ends of the stressed regions. For purposes of explanation, these abrupt changes in fiber geometry may be viewed as boundaries 44 at which the center line or longitudinal axis 46 of the fiber is abruptly shifted in the direction of the applied force. Such abrupt shifting of the fiber axis 46 causes light to be coupled from the fundamental $LP_{01}$ set of modes to the second order $LP_{11}$ set of modes at each of the boundaries 44. The particular second order mode to which the light is coupled depends upon the direction of force relative to the polarization of the applied light. For example, if the input light in the fundamental is vertically polarized, such light will uniquely couple to the vertical-perpendicular second order mode, and not to the vertical parallel second order mode, the horizontal-normal second order mode, or the horizontal parallel second order mode (see FIG. 1). Assuming now that the force is still vertical, but the input light is horizontally polarized in the fundamental mode, such light will couple uniquely to the horizontal parallel second order mode and not to any of the other second order modes.

Figure 5:
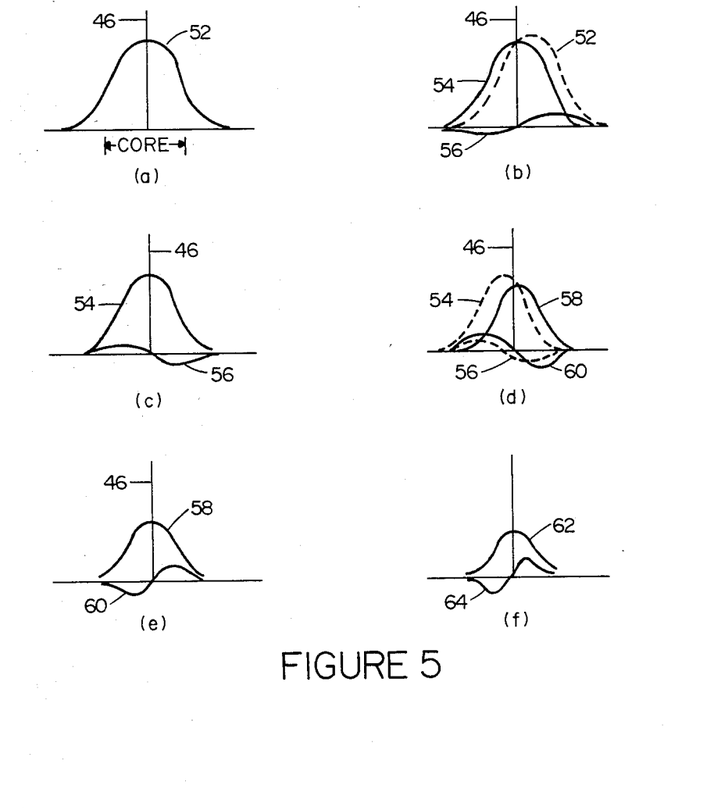
FIGS. 5a-f are diagrams showing the electric field distribution relative to the fiber axis at various points along the optical fiber of FIG. 4.

To more fully illustrate the manner in which light is coupled to the second order modes at each of the boundaries 44, the electric field distribution of a lightwave will be traced as it propagates through the fiber 24, from the left side to the right side, as viewed in FIG. 4. It will be assumed that the lightwave is vertically polarized and launched in the fundamental mode. As shown in FIG. 5a, just before the lightwave arrives at the first boundary 44, e.q. when it is at the location A in FIG. 4, the electric field distribution, illustrated by the curve labeled 52, will be symmetric about the center line 46, and well confined to the fiber core. As the lightwave crosses the boundary 44, to the location B in FIG. 4, the electric field distribution shown by the curve 52 will appear the same, relative to a fixed observer, since the electric field is continuous across the boundary 44, in accordance with Maxwell's equations. However, the fiber axis 46 is now shifted due to the deformation of the fiber 24 caused by the ridges 16, so that the curve 52 is no longer symmetrical about the axis 46, as shown in FIG. 5b. The curve 52, shown in dotted lines in FIG. 5b thus decomposes back into two normal modes, namely a fundamental mode, illustrated by the curve 54, and a small second order mode, illustrated by the curve 56. In other words, the nonsymmetric curve 52 is the sum of the first and second order normal mode curves 54, 56, respectively. Thus, at the first boundary 44, the decomposition of the curve 52 causes a small amount of fundamental mode light to be transferred to the second order mode.

Since the ridge 16 is one-half beat length long, as the light propagates from location B to location C in FIG. 4, the light in the second order mode will undergo a phase shift of 180° relative to the light in the first order or fundamental mode. Accordingly, as the point C in FIG. 4, the electric field distributions shown by the curves 54 and 56 will be the same, except that they are 180° out of phase, as illustrated in FIG. 5c. When the lightwave crosses the second boundary 44, and arrives at the point D in FIG. 4, the axis 46 of the fiber shifts back to an unstressed undeformed condition, and the modes 54, 56 are again nonsymmetrical with regard to the axis 46. Consequently, the light in the fundamental mode 54 again decomposes into a fundamental mode 58 of lesser amplitude than the mode 54, and a second order mode which is in phase with the second order mode 56, thereby yielding a resultant second order mode 60, as shown in FIG. 5d, which has an increased amplitude relative to the mode curve 56. It will be recognized that the 180° phase change between the modes during propagation from point B to point C, advantageously causes the light coupled from the fundamental to the second order mode to add to that previously coupled, such that the second order mode coupling is cumulative, rather than destructive.

As the light propagates from point D to point E, the first and second order modes undergo another 180° phase change, such that when the light reaches point E in FIG. 4, the electric field distribution is as shown in FIG. 5e. At the third boundary 44, the fiber axis again shifts, and the same process repeats, so as to cause light from the fundamental mode to be coupled to the second order mode, as illustrated by the curves 62, 64 in FIG. 5f. Thus, it may be seen from the foregoing that the abrupt boundaries 44 provide coupling locations at which a fraction of energy from the fundamental mode is coupled to the second order mode.

Figure 6:
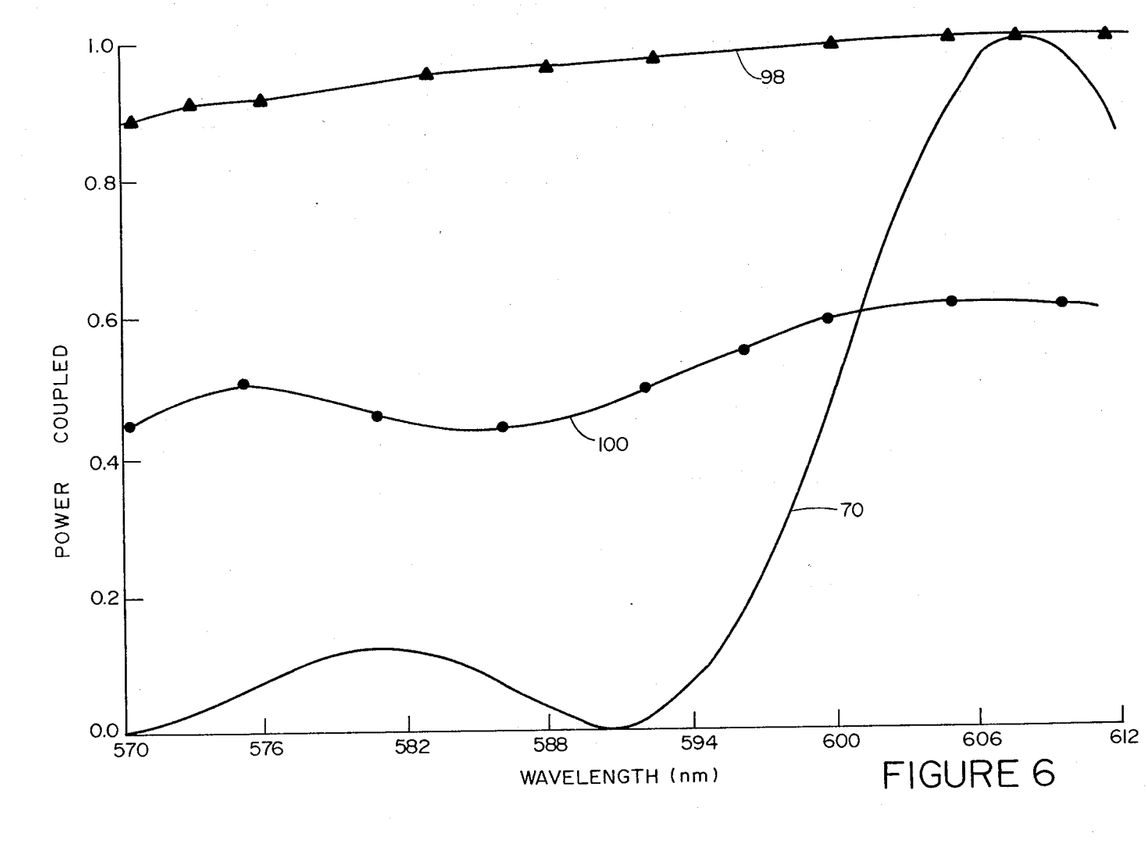
FIG. 6 is a graph of coupled power versus wavelength, illustrating the polarization dependence and wavelength independence of the coupler, as contrasted to conventional coupled mode theory.

From the above discussed coupled mode analysis, one would expect the performance of the coupler to be dramatically reduced when the spacing between the beginning of one ridge and the beginning of the next ridge 16 is not one beat length (or an integer multiple thereof). Calculations show that, in theory, the performance of the coupler of the present invention should generally follow the curve 70 of FIG. 6. For the preferred embodiment, maximum coupling was expected to occur at a wavelength of 608 nm, which yields a beat length equal to the ridge periodicity of 0.432 mm. At wavelengths above or below 608 nm, the curve 70 predicts that the coupling should rapidly decrease.

Figure 7:
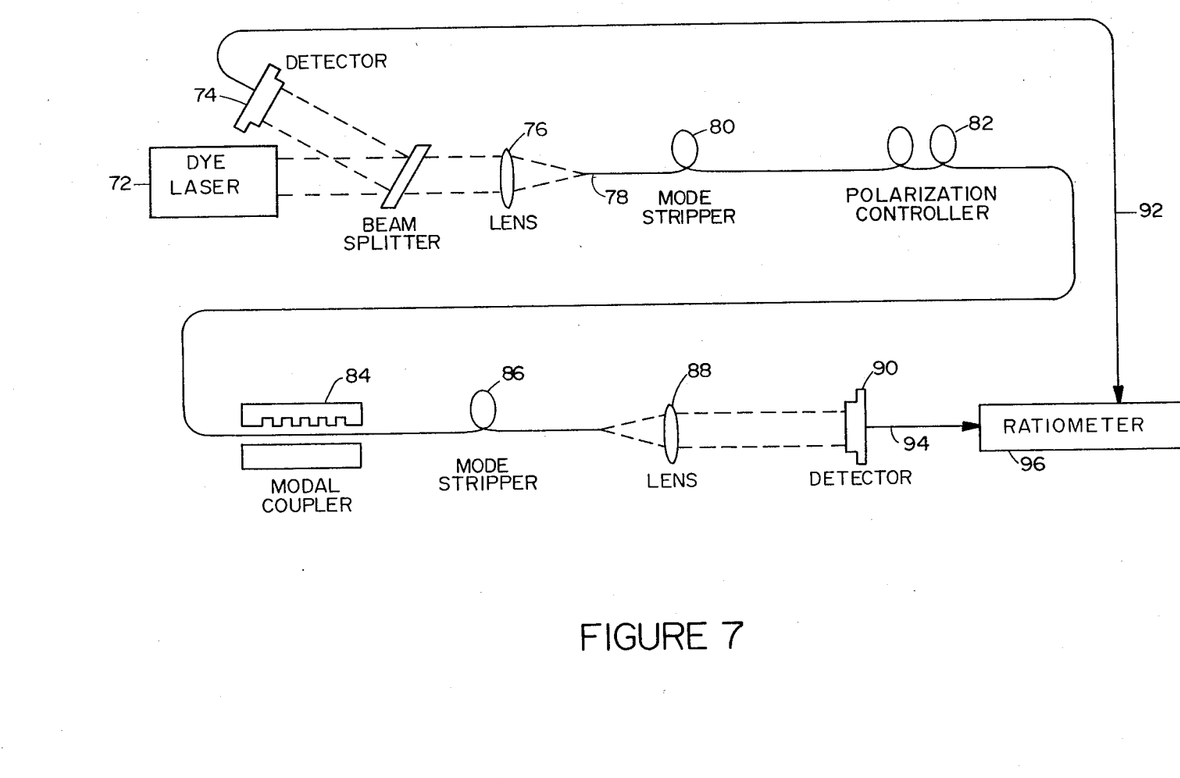
FIG. 7 is a schematic diagram showing the circuit arrangement utilized to test the performance of the coupler of the present invention, and to obtain the data points for the actual coupling curves shown in FIG. 6.

The performance of the thirty ridge coupler of the preferred embodiment was tested utilizing the circuit arrangement shown in FIG. 7. A frequency tunable dye laser 72 was used to produce the source light. This source light was impressed upon a beam splitter where approximately one-half of the light was directed to a detector 74, while the other one-half was impressed upon a lens 76, which focused the light for introduction into an optical fiber 78. The dye laser 72 was operated in a wavelength range below cutoff such that only the first and second order modes were launched in the fiber 78. The fiber 78 was wrapped around a 1.3 centimeter diameter post at the input and to provide a mode stripper 80 for stripping out any second order modes that were launched. This type of mode stripper is well known in the art, and is discussed in an article by Y. Katsuyama, entitled "Single Mode Propagation in a Two Mode Region of Optical Fiber by Using Mode Filter", *Electronics Letters*, 15, 442 (1979). An all fiber polarization controller 82 was formed in the fiber 78 after the mode stripper 80. A polarization controller of this type is disclosed in U.S. Pat. No. 4,389,090, issued June 21, 1983. The purpose of the polarization controller 82 is to vary the polarization of the guided input light such that it is e.g. linear-vertical. The fiber 78 then passes through a ridge structure such as that described in reference to FIGS. 2 and 3 to form the thirty ridge modal coupler 84 of the preferred embodiment. The fiber is then wrapped around another post to form a second mode stripper 86, identical to the mode stripper 80. At the output end of the fiber, the output light is directed against a collimating lens 88, which impresses the output light upon a detector 90. The two detectors 74, 90 are then connected by lines 92, 94, respectively, to a ratiometer 96. This ratiometer 96 displays, as an output, the ratio of the output light intensity, as measured by the detector 90, to the input light intensity, as measured by the detector 74.

In operation, the light input at the input end of the fiber 78 is first stripped of second order modes by the mode stripper 80, so that when the light enters the polarization controller, only the fundamental mode is present. The polarization controller is then used to adjust the polarization of the input light so that it is e.g. vertically linerly polarized upon entering the modal coupler 84. The coupler 84 is operated by appling a force to the upper ridged plate, as discussed above, to cause coupling of light from the fundamental mode to the second order mode. After leaving the coupler 84, the light is stripped of second order modes by the mode stripper 86, and any residual light in the fundamental mode is impressed upon the detector 90 through the lens 88. The wavelength of the input light was then varied from 570 nm to 612 nm to determine the sensitivity of the coupler 84 to variations in wavelength. As expected, maximum coupling occurred at a wavelength of 608 nm. Measurements indicated that the coupling of the vertically polarized fundamental mode to the second order mode (i.e. the vertical-perpendicular second order mode) was quite good, and that less than −40 dB of residual power was left in the fundamental mode at the output end of the fiber 78, which corresponds to 99.99% of the power being coupled from the fundamental to the second order mode. Insertion loss was measured by removing the output mode stripper and measuring the total power in the fiber while the coupler was operating. By comparing this value to the power in the fiber when the coupler was not operating, a loss of 9% was measured.

When the wavelength of the source light was varied from 608 nm, however, the coupler 84 exhibited unexpected behavior. Specifically, the coupling of the vertically polarized light remained at high level throughout the wavelength range from 570 to 612 nm, as illustrated by the curve 98 in FIG. 6, and thus, the coupling did not follow the theoretical curve 70. [The triangles on the curve 98 indicate actual data points.]

The tests described above in reference to FIG. 7 were repeated, this time for linearly horizontally polarized input light. As indicated by the curve 100 of FIG. 6, coupling of the horizontal polarization was relatively constant over the wavelength range, and peaked at 608 nm. [Dots on the curve 100 represent actual data points.] Thus, the coupling curves 98, 100 for vertically and horizontally polarized light, respectively, were both broad and did not follow the predicted coupled mode theory curve 70. It is significant, however, that the curve 100 for horizontally polarized light exhibits further anomalous behavior in that the amount of coupling is much less than for vertically polarized light, being on the order of only 4 dB. For both the curves 98 and 100, a vertical force was applied to the coupler 84 to cause coupling from the fundamental to the higher order modes.

Figure 3:
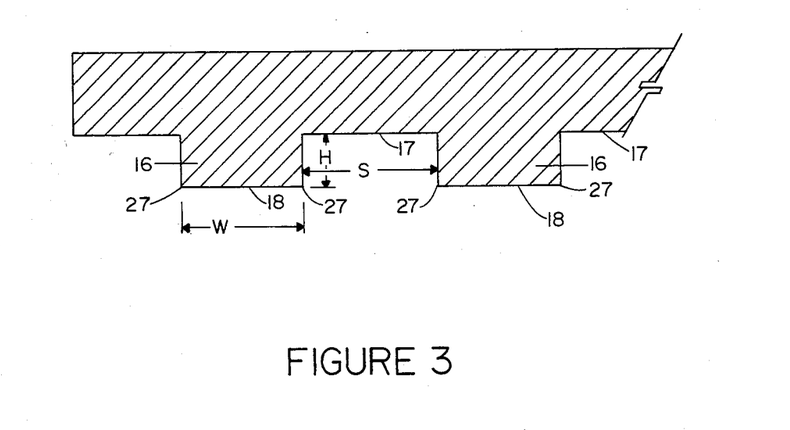
FIG. 3 is a cross sectional view, taken along the lines 3—3 of FIG. 2, showing the shape of the ridges.

Thus, the coupler of the present invention exhibits anomalous behavior when compared to conventional coupled mode theory, in that (1) the coupling is relatively constant for different wavelengths, and (2) such coupling is polarization dependent. Interestingly, the polarization dependence of the coupler appears to be related to the number of ridges 16 (FIG. 3). For example, when a ten ridge device is used, the discrepency between the coupling of the two polarization diminishes, and both polarizations couple on the order of b 99% of their power into the second order mode. For an eighty ridge device, neither polarization couples better than 20% of its power. The reasons for this surprising behavior of the coupler are not fully understood. It is theorized that the coupler does not follow conventional mode theory for two reasons: (1) because the $LP_{11}$ modes only approximate the true normal modes of the fiber, and (2) because the normally nonbirefringent fiber becomes birefringent when squeezed by the ridges 16 (FIG. 3).

Use of the Coupler as a Fiber Polarizer

Figure 8:
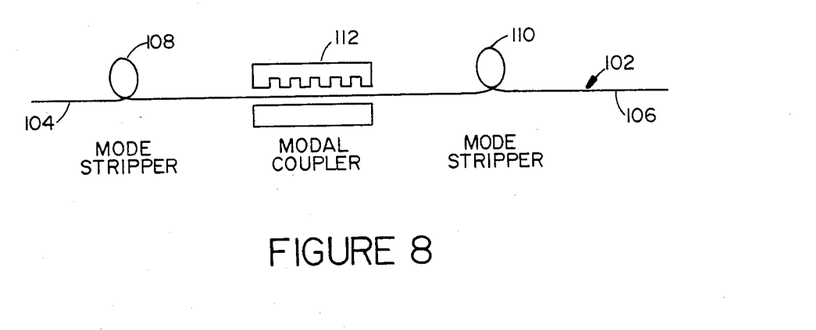
FIG. 8 is a schematic diagram of a fiber optic polarizer which utilizes the coupler of the present invention.

The above-described polarization dependence of the coupler may be advantageously utilized to provide an in-line all fiber bidirectional polarizer. As shown in FIG. 8, such a polarizer may comprise a single continuous strand of fiber 102 having end portins 104, 106. Mode strippers 108, 110 are located at the end portions 104, 106, respectively, and a modal coupler 112, such as the thirty ridge coupler of the preferred embodiment, is interposed between the mode strippers 108, 110. Preferrably, the number of ridges 16 on the modal coupler 112 are selected to maximize coupling in one polarization, (e.g. the vertical polarization) and minimize coupling of the orthogonal polarization (e.g. the horizontal polarization). As discussed previously in reference to FIGS. 7 and 8, using the thirty ridge device, 40 dB coupling of the vertically polarized fundamental mode to the higher order mode was achieved, while only 4 db of the horizontally polarized fundamental mode was coupled to the higher order mode. Consequently, such a modal coupler yields a 36 dB extinction ratio between the vertical and horizontal polarizations in the fundamental modes. In operation, light is input to one end portion of the fiber 102, e.g. the end portion 104. Second order modes are stripped by the mode stripper 108 so that only the fundamental mode enter the modal coupler 112. It will be assumed that vertical polarizations are well coupled, while horizontal polarizations are poorly coupled. Thus, if the light input to the coupler 112 is vertically polarized, substantially all of it will be coupled to the second order mode, and such light will be stripped by the mode stripper 110 so that the amount of light reaching the output fiber portion 106 is virtually zero. On the other hand, if the polarization of the input light entering the coupler 112 is horizontal, only a fraction of the light will be coupled to the second order mode and stripped by the mode stripper 110. Thus, much of the light will remain in the fundamental mode and propagate to the output end portion 106 of the fiber 102. As indicated above, with a thirty ridge device, a 36 db extinction ratio between the vertical and horizontal polarizations in the fundamental modes may be expected, yielding an all-fiber polarizer with performance comparable to that of thin polarizing films.

Use of the Coupler as a Mach-Zehnder Interferometer

Figure 9:
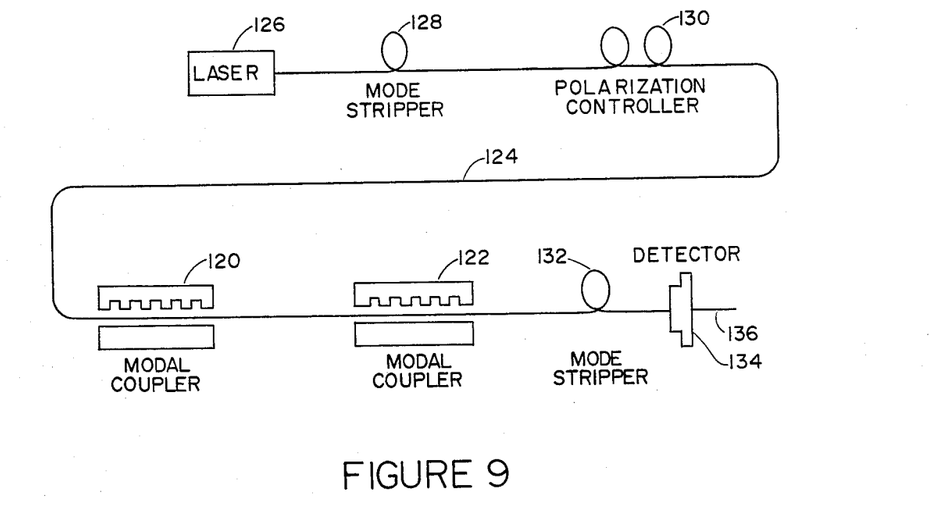
FIG. 9 is a schematic diagram of a single fiber Mach-Zehnder interferometer utilizing a pair of couplers constructed in accordance with the present invention.

As shown in FIG. 9, a Mach-Zehnder interferometer may be constructed by mounting two modal couplers 120, 122 in spaced relationship along a single continuous strand of optical fiber 124. Source light is produced by a laser 126, which is optically coupled to introduce light into the input end of the fiber 124. The source light from the laser 126 is first passed through a mode stripper 128, formed on the fiber 124, to remove second order modes. The light is then passed through a polarization controller 130, which is used to adjust the polarization of the light to e.g. linear-vertical. The guided source lightwave then enters the first coupler 120, which is set to approximately 50/50 coupling, such that half of the power is coupled to the second order mode. After propagating a distance through the fiber 124, the light then enters the second coupler 122. The light exiting the second coupler 122 passes through a mode stripper 132, formed on the fiber 24, to strip second order modes. The light then exits the fiber 124 and is impressed upon a detector 134 which outputs an electrical signal on a line 136. In the embodiment shown, the length of fiber between the modal couplers 120, 122 and the wavelength of the source light are selected such that, at the input end of the second coupler 122, there is zero phase difference between the light in the first order and second order modes. It will be recognized that if the phase difference between the modes is zero upon entering the coupler 122, the coupling to the second order mode will be at a maximum, while if the first and second order modes are 180° out of phase, the coupling by the coupler 122 will be at a minimum. Accordingly, with zero phase difference at the input end of the coupler 122, maximum coupling to the second order mode will occur. The second order mode is then stripped by the mode stripper 132, and the signal at the detector, i.e. the residual fundamental mode power, will be at a minimum. The amount of coupling of the coupler 122 may be varied until a minimum in the residual fundamental power is observed. The coupling is then fixed at this value and the portion of fiber between the couplers 120, 122 is exposed e.g. to an environmental quantity to be measured, such as temperature. Exposure to temperature will change the length of the fiber between the couplers 120, 122, and thus, cause the light in the first and second order modes to move out of phase upon entering the coupler 122. This will cause the coupling to the second order mode to decrease, and thus, the residual power in the fundamental mode, as measured by the detector, will increase. The output signal on the line 136 from the detector 134, therefore, provides a direct indication of the magnitude of the sensed environmental quantity. In one experiment, a dynamic range of the power in the fundamental mode of 30 dB was measured as the fiber was thermally expanded. This demonstrates that the device couples coherently and can be used in interferometric systems.

Thus, the modal coupler of the present invention has a variety of uses, e.g. as a single fiber polarizer, or a single fiber Mach-Zehnder interferometer. Additionally, the coupler may be used in a two channel data system. These uses are exemplary only, and other uses will be apparent to those skilled in the art.

What is claimed is:

1. A modal coupler, comprising:
   an optical fiber, having a longitudinal axis;
   a light source for introducing a lightwave into said optical fiber, said lightwave having a wavelength selected such that said fiber supports first and second spatial modes for said wavelength, said fiber having a beat length for said modes; and
   a member for applying force to said optical fiber at spaced intervals along said fiber axis, said force causing portions of said longitudinal axis to be displaced relative to other portions of said longitudinal axis such that said longitudinal axis shifts at each of said intervals in response to said force to cause coupling between said modes, said intervals spaced in accordance with the beat length for only said first and second spatial modes of said fiber, so that said coupling is cumulative between said first and second spatial modes.

2. A modal coupler, as defined in claim 1, wherein said force applied by said member to said fiber produces a series of spaced stressed regions along said fiber.

3. A modal coupler, as defined in claim 2, wherein said coupling occurs at locations along said fiber corresponding to a boundary of each of said stressed regions.

4. A modal coupler, as defined in claim 2, wherein each of said stressed regions is adjacent to another of said stressed regions, and wherein a boundary of one of said stressed regions is separated by one beat length from the corresponding boundary of an adjacent stressed region.

5. A modal coupler, as defined in claim 2, wherein said stressed regions are one-half beat length long and said stressed regions are separated by one-half beat length.

6. A modal coupler, as defined in claim 2, wherein the number of said stressed regions is selected to cause preferential coupling of one polarization relative to another polarization.

7. A modal coupler, as defined in claim 1, wherein said fiber is substantially nonbirefringent.

8. A modal coupler, as defined in claim 1, wherein said first and second modes of said fiber are the only spatial modes supported by said fiber.

9. A modal coupler, as defined in claim 1, wherein said coupler is bidirectional such that said coupling is the same regardless of the direction of propagation of said lightwave through said fiber.

10. A fiber optic apparatus, comprising:
    an optical fiber having a longitudinal axis;
    a light source for introducing light into said fiber at a wavelength selected to cause said fiber to support first and second spatial modes, said fiber having a beat length for said first and second modes;
    a modal coupler, mounted on said optical fiber, for coupling light between the first and second spatial modes at spaced intervals along said fiber axis, said intervals spaced in accordance with the beat length for only said first and second spatial modes of said fiber, such that said coupling is cumulative between the first and second spatial modes of said fiber, said modal coupler adapted to preferentially cumulatively couple light of a first polarization relative to light of a second polarization, such that any of said cumulatively coupled light of said first polarization is coupled from one of said modes to the other of said modes to a greater extent than any of said cumulatively coupled light of said second polarization; and
    means for outputting light only from one of said modes of said fiber to cause said apparatus to output light substantially in only one of said polarizations.

11. A single fiber Mach-Zehnder interferometer for detecting interference between two light signals, comprising:
    a single strand of optical fiber having a longitudinal axis; and
    a light source for introducing light into said fiber at a wavelength selected to cause said fiber to support first and second spatial modes, said light being divided between said modes to provide said two light signals, said fiber having a beat length for said first and second modes, said modes providing respective optical paths for propagation of said light signals;
    a modal coupler for coupling light between said first and second modes at plural intervals along said fiber axis, said intervals spaced in accordance with the beat length for only said first and second modes, such that said coupling is cumulative between the first and second spatial modes of said optical fiber, said coupler mounted along the axis of said optical fiber such that said modes are coupled after propagation of said light signals through a substantial length of said fiber, said coupling causing said signals to interfere; and means for detecting light from one of said first and second modes, so as to detect optical path length changes in the optical paths.

12. A method of coupling light between first and second order modes of an optical fiber, comprising:

introducing light into said optical fiber at a wavelength selected to cause said fiber to support only said first and second order modes;

applying force to said fiber at plural intervals along second order modes, said intervals spaced such that said periodic coupling is cumulative; and selecting the number of said intervals to provide preferential coupling for a first polarization relative to a second, orthogonal polarization from one of said modes to the other of said modes.

13. A modal coupler, comprising:

a single multimode optical fiber for propagating light of first and second orthogonal polarizations, said fiber having a longitudinal axis; and a member for applying force to said multimode fiber at plural intervals along said axis, said intervals spaced such that said coupling is cumulative between two spatial modes of said multimode fiber, the number of said intervals selected to cause said coupling to be substantially greater for said first polarization than for said second polarization.

14. A mode coupler, as defined by claim 13, wherein said two modes comprise exclusively first and second order modes of said fiber.

15. A method of coupling light exclusively between two spatial modes of an optical fiber, said optical fiber having a longitudinal axis, said method comprising;

introducing a light wave into said optical fiber, said lightwave having a wavelength selected such that said fiber supports first and second spatial modes for said wavelength;

applying force to said optical fiber at spaced intervals along said fiber axis to couple light between said first and second modes; and spacing the intervals such that said coupling is cumulative between only said first and second modes.

16. A fiber interferometer, comprising:

an optical fiber having first and second propagation modes, said first and second modes providing first and second optical paths through said fiber;

a first modal coupler which couples said optical paths at a first selected location on said fiber;

a second modal coupler which couples said optical paths at a second selected location on said fiber, said first location spaced from said second location by a segment of said fiber; and a detector which detects light in one of the optical paths independently of any light in the other of the optical paths to sense changes in said optical paths in said segment of said fiber.

17. A fiber interferometer, as defined by claim 16, wherein said first and second modes comprise spatial modes.

18. A fiber interferometer, as defined by claim 17, wherein said first and second modes are first and second order spatial modes.

19. A fiber optic polarization coupler, comprising:

an optical fiber having first and second spatial propagation modes; and a modal coupler which cumulatively couples light between said spatial modes, said modal coupler being adapted to preferentially cumulatively couple light of a first polarization relative to light of a second polarization, such that a first fraction of light of said first polarization is coupled and a second fraction of light of said second polarization is coupled, said first fraction being significantly greater than said second fraction.

20. A modal coupler, comprising:

an optical fiber having a longitudinal axis; and a light source for introducing a lightwave into said optical fiber, said lightwave having a wavelength selected such that said fiber supports first and second spatial modes such that said fiber supports first and second spatial modes for said wavelength, said fiber having a beat length for said modes, the longitudinal axis of said fiber being displaced at spaced intervals along said fiber such that portions of said longitudinal axis are shifted relative to other portions of said axis to cause coupling between sid modes, said intervals spaced in accordance with the beat length for only said first and second spatial modes of said fiber such that said coupling at said intervals is cumulative.

* * * * *

UNITED STATES PATENT AND TRADEMARK OFFICE
CERTIFICATE OF CORRECTION

PATENT NO. : 4,768,851

DATED : September 6, 1988

INVENTOR(S) : Shaw, et al.

It is certified that error appears in the above-identified patent and that said Letters Patent is hereby corrected as shown below:

Column 1, line 43, please change "spatial the" to --the spatial--.

Column 5, line 60, please change "the transverse" to --are transverse--.

Column 14, line 43, please change "sid" to --said--.

Signed and Sealed this

Twentieth Day of August, 1991

*Attest:*

HARRY F. MANBECK, JR.

*Attesting Officer*     *Commissioner of Patents and Trademarks*